Inventor
George H. Studtmann
By Peter S. Lucyshyn
Attorney

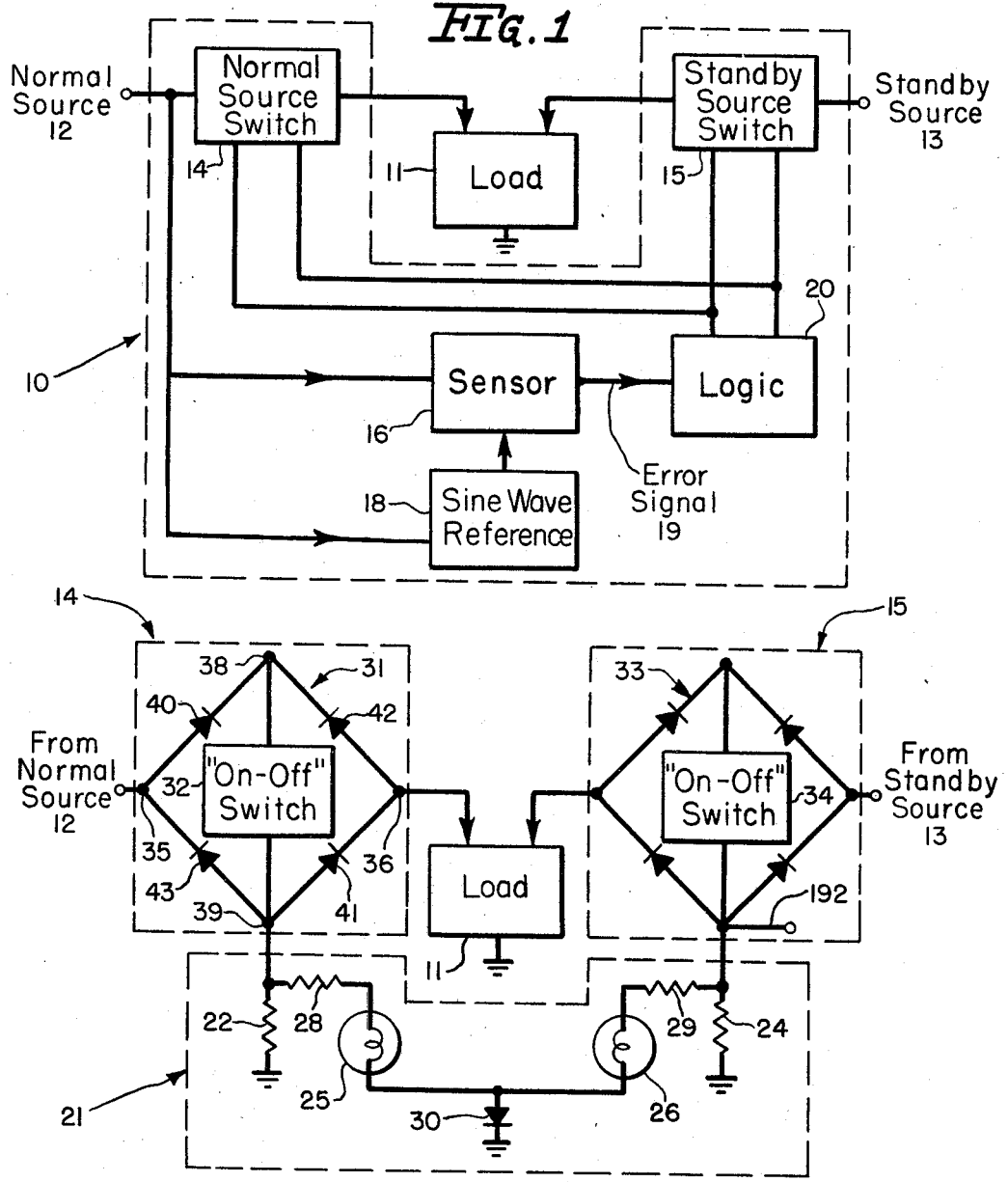

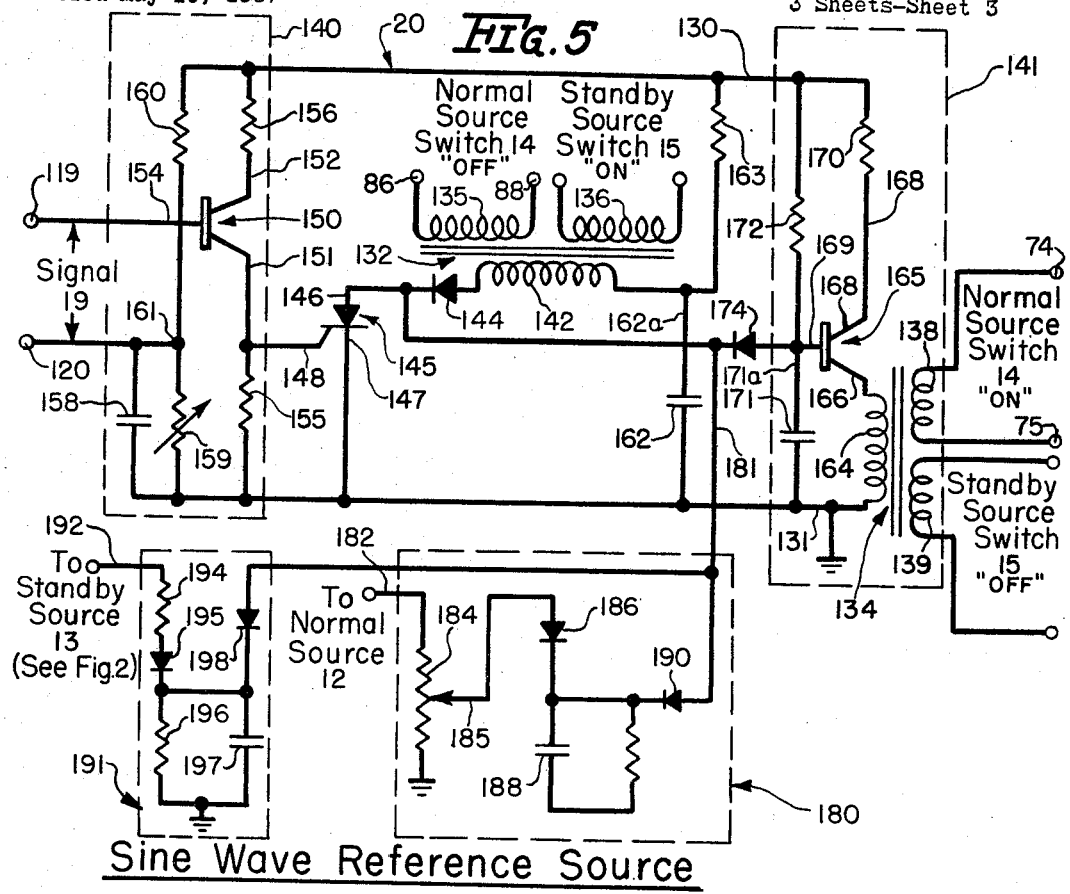
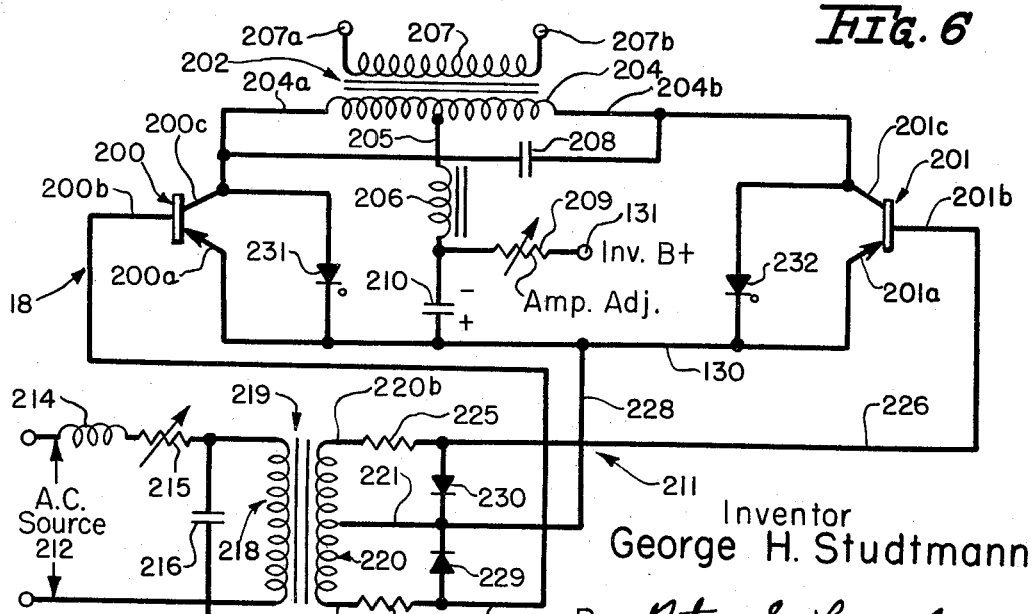

United States Patent Office 3,509,357
Patented Apr. 28, 1970

3,509,357
STATIC TRANSFER SWITCHING SYSTEM
George H. Studtmann, Mount Prospect, Ill., assignor to Borg-Warner Corporation, Chicago, Ill., a corporation of Illinois
Filed May 10, 1967, Ser. No. 637,444
Int. Cl. H02j 9/00
U.S. Cl. 307—64
9 Claims

ABSTRACT OF THE DISCLOSURE

A static transfer system includes a first switch for connecting a normally used A-C source to a load and a second switch for connecting a standby source to the load. A sensor is connected to an A-C sine wave reference source for comparing at every instant of time the normal A-C sine wave signal to the reference source signal and feeding an error signal to a logic circuit at any instant in time when the normal source signal falls below the reference signal. The logic circuit is effective to instantaneously connect the load to the standby source and disconnect the load from the normal source irrespective of the load power factor, and to reconnect the load to the normal source and disconnect the standby source from the load when the normal source is again capable of handling the load.

BACKGROUND OF THE INVENTION

In many uses of inverters, for example, in providing an A-C signal for a communications system or supplying power in an aircraft, it is critical that the load be continuously energized without interruption or change in the signal. A complete loss or a change in the magnitude or frequency of the power source could mean loss of synchronization in a synchronized communications system. In telemetry, as one instance of using a source of pulse signals, should a pulse be missed or move out of phase, misleading information could be transmitted to a controlled unit. In each of these instances a system is required which will sense any deviation of the energization of the load and respond by correcting the deviation. The transfer systems presently known in the art are either of an electromechanical or of a static type. The electromechanical systems require in the range of 60 to 200 milliseconds to actuate while the static systems presently known require at least a quarter of a cycle to actuate.

Accordingly, it is the object of the present invention to provide an improved switching system operating at a low signal level which continuously monitors A-C energization of a load from a normal source, and responds at any instant in the cycle to any variation in the amplitude of the signal of the normal source outside of a predetermined range to automatically and instantaneously switch to a standby source, in complete synchronization and without interruption. While not so limited in its application, the invention will find especially advantageous use in a static inverter system which has a line source for normally energizing a load and an inverter source standing by and operating in synchronization with the line source. The inventive system, upon sensing a variation in the energization signal level outside of a predetermined range, automatically disconnects the line source and automatically connects the standby inverter source.

It is a more detailed object of the present invention to provide a system which utilizes semiconductor circuit elements to sense the signal level of a normally used A-C source, to effect static switching to a standby A-C source instantaneously if the output of the normally used source varies outside a predetermined range, and to disconnect the normal source. Along this line, the switching is to be effected substantially instantaneously without loss of power to the load, for example, within 100 microseconds.

It is a further object of the present invention along the lines of the above to effect instantaneous transfer from a normally used source to a standby source in response to a complete short at the normal source at any load power factor thus assuring no loss of energization of the load.

It is an overall object of the present invention to provide a switching system of the above type which is economical to manufacture and easy to maintain being adaptable for use with alternating signal supply sources.

SUMMARY OF THE INVENTION

The present invention comprises an A-C source switching system coupled to a first, normally used source, and also coupled to a second, standby source. The system normally couples the first source to a load. A first switch is selectively operable to couple the normally used source to the load, and a second switch is selectively operable to couple the standby source to the load.

Particularly in accordance with the present invention, means is provided for producing an A-C reference signal corresponding in waveshape to the first source signal. Means is also provided to continuously monitor the first source signal and to compare the first source signal to the reference signal, such that an error signal is produced if the amplitude of the respective first source and reference signals fail to correspond. Lastly, means is supplied to effect operation of the respective first and second switches substantially instantaneously in response to presence of the error signal, to connect the standby source to the load and disconnect the normally used source from the load.

THE DRAWINGS

FIGURE 1 is a block diagram of a switching system embodying the present invention;

FIGURE 2 is a schematic diagram, partly in block form, showing the means for selectively coupling a normally used source and a standby source to a load;

FIGURE 5 is a schematic diagram of a logic circuit as represented by a block in the diagram of FIGURE 1; and FIGURE 6 is a schematic diagram of an exemplary reference signal source establishing a sine wave signal used as a reference by the sensor of FIGURE 4.

DETAILED DESCRIPTION OF THE INVENTION

Figure 3:
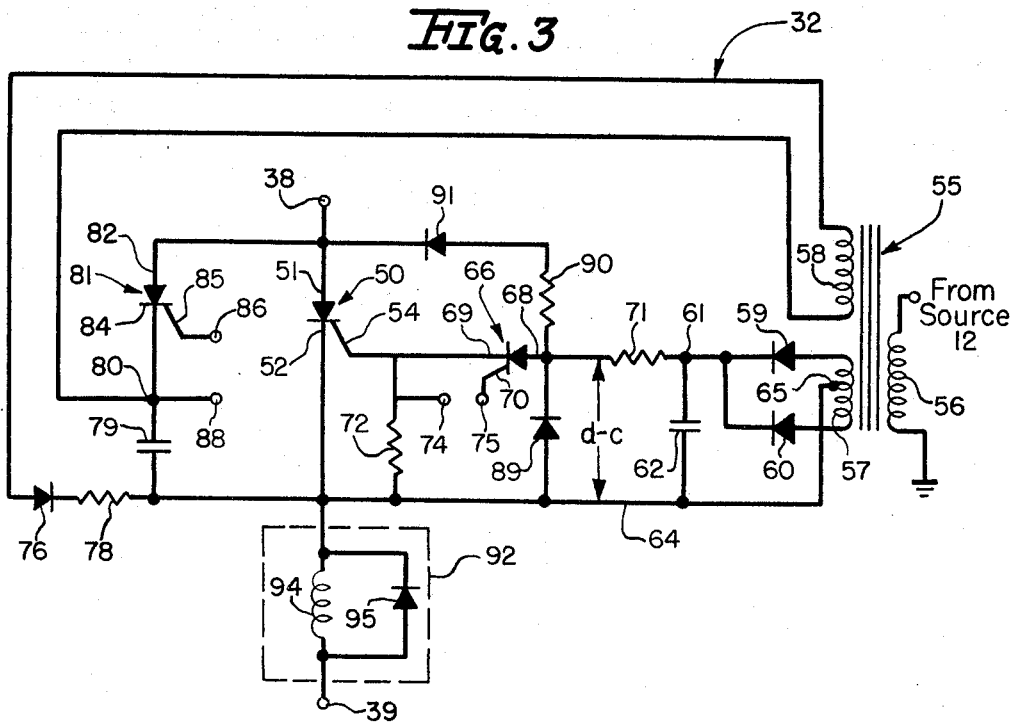
FIGURE 3 is a schematic diagram showing details of a portion of the "on-off" switch circuit of FIGURE 2.

Turning to the drawings and FIGURES 1 and 2 in particular, there shown is a switching system 10 interposed between a load 11 and a pair of sources, a first or normally used source 12 and a second or standby source 13. For coupling the respective sources to the load 11, a first or normal source switch 14 permits selective connection of the source 12 to the load and a second or standby switch 15 permits selective connection of the other source 13 to the load.

In accordance with the present invention the improved A-C switching system 10 effects substantially instantaneous transfer from the normal A-C source 12 to the standby A-C source 13 by monitoring the A-C output of the normally used source 12, comparing that signal to an A-C reference signal, and if at any instant during the cycle the amplitude of the signal is outside of a permitted predetermined range, effecting instantaneous, positive switching so that the load is continuously energized while the defective, normally used source is disconnected. The output of the normal source 12 is monitored by a sensor 16 and compared to a signal output of a reference A-C source 18, illustratively a sine wave source. The reference source 18 is coupled to the normal source 12 so as to provide a reference signal synchronized with the normal source. If at any instant during the cycle the amplitude of the voltage output of source 12 differs from the reference voltage by more than a permitted predetermined amount, sensor 16 produces an error signal 19 and the latter is fed to a logic circuit 20. The exemplary system 10 is designed to respond to voltage levels so that any conditions which cause the voltage to vary outside a predetermined range effects a transfer of the load. Examples of such conditions are a short circuit in the source, abnormally low source voltage and a high impedance or open circuit in the source. The system is also adaptable to respond to an excessive voltage from the source.

Turning to the details of circuit 10, means are provided for indicating which source is energizing the load 11. Shown in FIGURE 2 is an indicator circuit 21 which includes respective swamping resistors 22, 24. The first resistor 22 has one end connected to the normal source switch 14, and the second resistor 24 has one end connected to the standby source switch 15. The opposite ends of the resistors 22, 24, respectively, are connected to ground.

To present a visual indication of which switch is "on," a neon bulb 25 is connected across resistor 22 and another neon bulb 26 is connected across resistor 24. The respective neon bulb circuits include, in series with bulb 25, a current limiting resistor 28, and in series with bulb 26 another current limiting resistor 29. Both of the neon bulb circuits are completed to ground through a diode 30. The diode 30 provides the necessary blocking of halfcycles of voltage to assure that the proper neon bulb is energized.

Further describing the system 10, as shown in FIGURE 2, switch circuit 14 includes a diode bridge 31 and an "on-off" switch 32 and switch circuit 15 includes a diode bridge 33 and an "on-off" switch 34. The diode bridge 31 includes respective junctions 35, 36 and 38, 39, and respective dodes 40, 41, 42, 43, connected between the junctions. For controlling energization of the load 11, a circuit is completed between bridge junctions 35, 36 if the switch 32 is "on." Since both of the "on-off" switches 32, 34 are the same, each having the same semi-conductor elements and triggering means and being connected to their respective diode bridges in the same manner to effect a similar result, only switch 32 is described. There is a difference in operation in that switch 32 is only "on" when switch 34 is "off," and vice versa switch 34 is only "on" when switch 32 is "off."

Turning to FIGURE 3, thereshown is a schematic of the "on-off" switch 32. As therein illustrated, the switch circuit includes an electronic switch 50, shown as a silicon controlled rectifier, connected between junction 38, 39 of diode bridge 31. The diode bridge has been selected to facilitate implementing the necessary control for commutating off an A-C switch. The necessity for commutation, as described in more detail subsequently, is presented because with a reactive load, the voltage and current are not in phase and their "zero" crossing points do not coincide. The silicon controlled rectifier 50 has an anode 51, a cathode 52 and a gate 54. As long as the SCR 50 is gated "on" and the appropriate energizing voltage is supplied energy may flow through the switch circuit 14. The bridge arrangement of diodes assures that though the source signal changes polarity or alternates, the SCR anode and cathode, except for small increments of time near the zero crossing of the voltage, are continually forward biased. Thus, if the gate of the silicon controlled rectifier is turned "on" the SCR 50 conducts.

A D-C source is necessary for operating the switch 32 in order to selectively provide a gating signal for the SCR 50 to turn it "on" and also to provide a reverse bias to kill the anode and turn the SCR 50 "off." Effecting the turning "on" and turning "off" of the SCR 50, presents a problem when the voltage and current are out-of-phase as in the instance when a reactive load is being fed. In the illustrative circuit a stand-by isolated D-C source is provided to effect the desired operation and includes a transformer 55 coupling the switch circuit to the source 12, the transformer having a primary winding 56 and a pair of secondary windings 57, 58 with rectifier circuits being connected to the latter. The output from the secondary winding 57 is utilized to turn the SCR 50 "on" while the signal from the secondary 58 is utilized to turn the SCR 50 "off."

To convert the A-C signal to a D-C signal for gating SCR 50 "on," a full wave rectifying circuit is coupled to transformer secondary winding 57. The latter includes a pair of diodes 59, 60, respectively, one end of each of the latter being connected to an end of the transformer secondary winding 57; and respective opposite ends of the diodes 59, 60, being connected to a common junction 61. In a manner well known in the art, the common junction 61 is connected to one end of a filtering capacitor 62 and the opposite end of the capacitor is coupled to a common bus or conductor 64 which itself is connected to a center tap 65 of the transformer secondary 57.

For selectively applying a triggering signal to gate 54 of SCR 50, another silicon controlled rectifier 66 is provided having an anode 68, a cathode 69 and a gate 70. The anode 68 of the SCR 66 receives the D-C signal from the rectifier circuit common junction 61 through a current limiting resistor 71. The SCR cathode 69 is coupled to gate 54 of SCR 50. A resistor 72 is connected in parallel with the gate 54 and cathode 52 of the SCR 50, in order to provide a low impedance across the gate of SCR 50. Accordingly, when the triggering SCR 66 is turned "on," a gating signal is applied to the switch circuit SCR 50.

Selective, positive turn "on" of the A-C switch is effected by applying a signal between the cathode 69 and gate 70, respectively, of SCR 66. To this end, in the illustrative schematic, a pair of terminals 74, 75 are connected to the cathode and gate, respectively. As is explained subsequently, the signal for SCR 66, is received from the logic circuit 20. Once SCR 66 is turned "on," the D-C signal applied thereto latches the silicon controlled rectifier "on" and maintains it forward biased or conductive so that a voltage across resistor 72 maintains the SCR 50 gated "on." Summarizing, the above described D-C gate is used in order to assure that the SCR 50 is gated "on" at all times that the current may want to flow through the switch 32.

Turning now to the portion of switch circuit 32 for quickly turning SCR 50 "off," i.e. killing the anode of the latter, a half wave rectifying circuit is connected to the other secondary winding 58 of transformer 55. This circuit includes a diode 76 and a resistor 78 in a series circuit connecting one end of the transformer secondary winding 58 to the common bus or junction 64. The latter is connected to one end of an energy storing capacitor 79. The opposite end of the transformer secondary 58 is connected to a junction 80 at the opposite end of the capacitor 79. Describing the exemplary selectively operable switch for quickly forcing "off" SCR 50, a silicon controlled rectifier 81 having an anode 82, a cathode 84 and a gate 85 is connected in series with the capacitor 79 and across the anode 51 and cathode 52, respectively of SCR 50. A pair of terminals 86, 88 are connected, respectively, to the gate 85 and cathode 84 of SCR 81 so that a gating pulse can be received by SCR 81 permitting selective turn "on" of the "force-off" circuit.

If a gating pulse is applied to terminals 86, 88 and SCR 81 is turned "on" the negative end of charged capacitor 79 is coupled to the anode 51 of SCR 50 lowering the potential and killing the anode. Thus, SCR 50 is turned "off."

A small portion of the discharge of the capacitor 79 is effected through a path which includes a diode 89 leading from the common bus 64 to a discharge resistor 90, and another diode 91 which connects to the anode of SCR 81. This discharge effects turn "off" of the switching SCR 66. This is accomplished when the conducting diode 89 lowers the potential of anode 68.

The main discharge path for capacitor 79 is through a circuit including an inductive circuit 92, one of the two pairs of diodes 40, 41 or 42, 43, respectively, and SCR 81. The inductor 94 provides an impedance to the discharge of the capacitor 79 through the diode bridge so that discharge occurs through the path described, and thereby the capacitor discharge is slowed down to where it can switch "off" and hold off SCR 50 for a sufficient time period until its blocking ability has been regained. The diode 95 limits the reverse voltage build-up across inductor 94 and permits the energy which was stored therein during the commutation period to dissipate.

Figure 4:
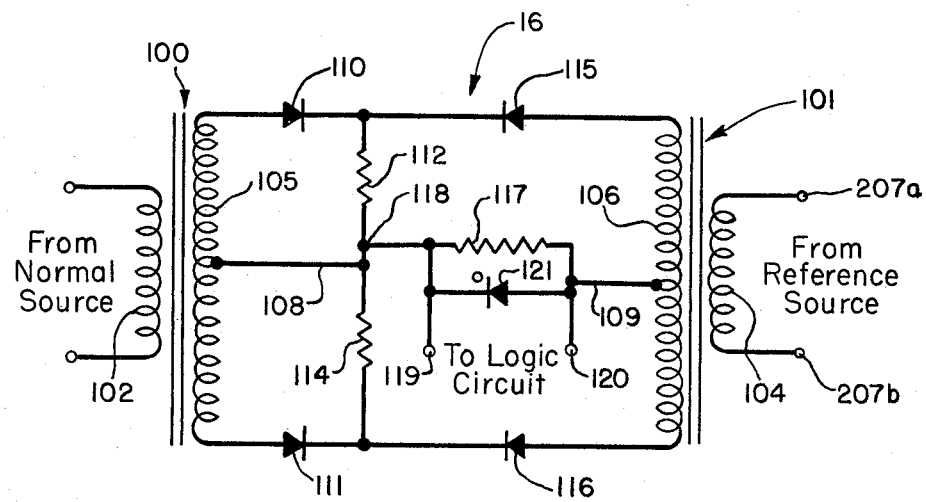
FIGURE 4 is a schematic diagram of a sensor as represented by a block in the diagram of FIGURE 1.

As has been emphasized, a feature of the present invention is that it operates as an instantaneous transfer switch with little or no loss of power to the load. The system does not wait a quarter-cycle or a half-cycle in a 400 cycle-per-second system to sense loss of power to a load and then switch in the standby source. Accordingly, as is shown in FIGURE 4, the sensing circuit 16 is provided to compare at all times the signal from source 12 to a signal from the reference source 18. The output of the latter must be such as to permit continual monitoring of the normal source and effectively cooperate in producing an error signal if there is a deviation outside a predetermined range.

Describing the monitoring portion of the system, the signal from the normally connected source 12 is received by a first transformer 100 and the signal from reference source 18 is received by a second transformer 101. For this purpose the first transformer 100 has a primary winding 102, while the second transformer 101 has a primary winding 104. Each of the transformers has a secondary winding 105 and 106, respectively, and each of the secondaries has a center tap 108, 109, respectively. The secondaries are coupled by a network which permits comparing the normal source signal to the reference source signal. Describing the network, the secondary 105 of transformer 100 has connected in series with it at opposite ends respective switching elements or diodes 110, 111. Each of the diodes is connected to the center tap 108 through respective resistors, a resistor 112 connects diode 110 to center tap 108, a resistor 114 connects the other diode 111 to the same center tap. The diodes 110, 111 are connected into the circuits so that during respective halves of the cycle of an A-C signal there is a voltage, first across resistor 112 and then across resistor 114.

Turning to the network associated with the other transformer 101, as already described, the transformer primary 104 is connected to the reference source 18. For coupling the opposite ends of the secondary 106 to the aforementioned resistors 112, 114, there are provided respective switching elements or diodes 115, 116. The center tap 109 of the secondary 106 is connected through a common impedance, in the illustrative embodiment a resistor 117 to the center tap 108 of the transformer secondary 106 at a junction point 118. The function of the resistor 117 is to provide a signal that is fed to the logic circuit 20. The junction point 118 is also the point at which the respective resistors 112, 114 are connected to the center tap 108. As is clear from observing the circuit of FIGURE 4, if the signal at the secondary 105 is equal to or greater than the signal at the secondary 106, then diodes 115, 116 do not conduct, and there is no current flow in resistor 117. Accordingly, there is no voltage drop across resistor 117 and no error signal output. Summarizing the above, a subcircuit of illustrative circuit 16 including diodes 110, 115, respectively, and the upper portions of respective secondary windings 105, 106, compares the first half-cycle of sine waves produced by sources 12, 18, respectively, and another subcircuit of the same circuit 16 including diodes 111, 116, respectively, and the lower portions of respective secondary windings 105, 106, compares the second half-cycle of the same source sine waves. The switching elements or diodes are illustratively coupled face-to-face, in series, and are responsive to a voltage difference across the series connection to permit conduction by either one diode or the other diode, and in the present instance only if diodes 115 or 116 conduct is there an error signal across impedance 117. If at any time during the cycle the amplitude of the signal appearing across secondary 105 falls below the amplitude (neglecting diode voltage drops) of the signal appearing across secondary 106, then a current flows through center tap 109 and resistor 117 producing a voltage drop thereacross. This is the error signal 19 which appears across a pair of terminals 119, 120. To limit the voltage of error signal 19, a Zener diode 121 is connected in parallel with the resistor 117. Though the sensing circuit shown in FIGURE 4 is constructed for sensing a reduction in voltage, it can also be easily adapted to sense excessive source voltage.

Shown in FIGURE 5 is a schematic of the logic circuit 20 for controlling operation of the switch circuits 14, 15. The logic circuit 20 is energized by a D-C source represented by a common positive bus 130 and a negative or ground bus 131. The logic circuit 20 includes a pair of output transformers 132, 134, respectively. As is shown by the legends in FIGURE 5 a pulse output from transformer 132 will turn "off" the normal source switch 14 and turn "on" the standby source switch 15. On the other hand a pulse output from transformer 134 will turn the normal source switch 14 "on" and turn the standby source switch 15 "off." Describing the illustrative logic circuit further, the normal source switch 14, which receives a pulse from transformer 132 through the terminals 86, 88 responds by disconnecting the normal source from the load as has been described. The same switch structure is responsive to a pulse output from the other transformer 134 received from terminals 74, 75 to connect or couple the normal source to the load. Each of the output transformers includes a pair of secondaries 135, 136 and 138, 139, respectively. The secondary 135 of transformer 132 and the secondary 138 of transformer 134 are coupled to the normal source "on-off" switch 32, while the other secondaries 136 of transformer 132 and secondary 139 of transformer 134 are coupled to the standby source "on-off" switch 34. As already mentioned, the latter is not described in detail because its structure is the same as that of switch 32.

For effecting a pulse output at transformer 132, there is provided an error signal responsive circuit 140 coupled to error circuit terminals 119, 120. On the other hand, for providing a pulse output at transformer 134 under normal operating conditions there is provided a pulsing circuit 141. Turning to the circuit for producing a pulse at transformer 132, the latter has a primary 142 which is connected through a diode 144 to a switching means, herein shown as a silicon controlled rectifier 145 having an anode 146, a cathode 147 and a gate 148. The cathode 147 is connected to the ground terminal 131 while the gate 148 is coupled to circuit 140 and adapted to receive triggering pulses therefrom.

Describing the circuit 140, as herein illustrated the latter includes a unijunction transistor 150 having a pair of bases 151, 152 and an emitter 154. As is well known in the art, the unijunction transistor 150 is connected to a biasing circuit which establishes an interbase firing voltage, and when this firing voltage is exceeded by the signal applied between a base one and an emitter, then the unijunction transistor becomes conductive between these two elements.

An ancillary feature of the present invention is that the triggering circuit 140 provides a relatively simple, yet sensitive detector for the error voltage. The circuit is so arranged as described below that the error signal provides only a fraction of the energy necessary to trigger the unijunction, the remaining energy being provided by the bias supply. Describing the circuit for biasing the unijunction transistor, there is a base one resistor 155 connected to ground terminal 131 and a base two resistor 156 connecting the unijunction transistor to the D-C supply positive terminal 130. For providing a triggering signal between the base one 151 and the emitter 154, there is included a capacitor charging circuit having a capacitor 158 in parallel with a variable resistor 159, the latter two elements are connected in series with another resistor 160. The capacitor 158 and first resistor 159 are connected to the ground terminal 131 while the other resistor 160 completes the capacitor charging circuit by being connected to the supply positive terminal 130.

For completing the UJT firing circuit between base one 151 and the emitter 154, one of the sensor circuit terminals 119 is connected to the UJT emitter 154 while the other of sensor circuit terminals 120 is connected to a common junction 151 of the capacitor 158, the resistor 159, and the resistor 160. In practice the voltage appearing across capacitor 158 is adjusted by means of resistor 159 to be slightly below the firing voltage of unijunction 150. The error signal 19 is summed with the voltage across 158 and whenever the sum exceeds the firing voltage of UJT 150 the unijunction becomes conductive. When this occurs the capacitor 158 discharges and establishes a pulse signal across resistor 155. Connected across the resistor 155 are the cathode 147 and gate 148 of the SCR 145. Thus, a pulse signal across the resistor 155 gates the SCR 145 "on." It is clear from the foregoing that even with relatively small values of error signal 19 the circuit 140 responds to trigger "on" SCR 145.

As can be appreciated from the foregoing explanation of the structure and operation of the "on-off" switches 32, 34, respectively, they have the feature that a single pulse effects operation. In other words, the system is bistable and subsequent pulses are not necessary to maintain the switches in the state to which they have been actuated. The respective pulse output circuits of the logic, that is the circuit including transformer 132 associated with SCR 145 and the circuit 141 including transformer 134, are both operative to provide the necessary pulses in response to sensing whether the normal source 12 is within the permitted predetermined range.

For forward biasing the SCR 145 to respond to a pulse at its gate 148 from the error signal sensing circuit 140, an RC circuit is provided including a capacitor 162 and a resistor 163. An end 162a of the capacitor 162 is connected through the transformer primary 142 and the diode 144 to the SCR anode 146. The RC circuit is coupled between the positive and negative terminals 130, 131, respectively of the D-C source so that the capacitor end 162a is charged positively. When the SCR 145 is gated "on," the capacitor 162 discharges through winding 142 to produce a pulse which is fed through the transformer secondaries 135, 136 to the associated circuitry of switches 32 and 34 and acutates the latter to one of the alternative states described to effect instantaneous disconnection of normal source 12 and connection of standby source 13. The resistor 163 and resistor 172 (the function of which is to be described subsequently) are chosen large enough in ohmic value so that holding current cannot be supplied to SCR 145. Therefore, once the pulse appearing across resistor 155 disappears, SCR 145 reverts to a blocking state.

Upon discharging, the voltage of capacitor 162 is lowered to a nominal value. Because the time constant of the RC network including capacitor 162 and resistor 163 is long, the voltage across capacitor 162 builds up only slightly and the additional gating pulses produced by circuit 140 in response to the presence of an error signal, discharge the slight voltage build-up. Accordingly, the subsequent pulses fed to winding 142 are only of a small, insignificant magnitude.

Having presented the structure in the logic circuit 20 responsive to the presence of the error signal 19, now described is the portion of the logic circuit responsive to the disappearance of the error signal. Pulse producing circuit 141 initiates a switching operation, returning the normal source 12 to energizing the load and disconnecting the standby source 13 from the load, by pulsing primary 164 of the pulse transformer 134.

For providing the switching pulse for transformer 134, the circuit 141 includes a unijunction transistor 165 having respective bases 166, 168, and an emitter 169. The base one 166 is connected through the transformer primary 164 to ground conductor 131 and the base two 168 is connected through a current limiting resistor 170 to the supply positive terminal 130. To initiate conduction in the base one-emitter circuit of UJT 165 a capacitor 171 is coupled thereacross. The capacitor 171 is connected into a charging circuit across the source terminals 130, 131 by a resistor 172. When the voltage across capacitor 171 achives the breakdown voltage of UJT 165, it discharges and thereby feeds a pulse to the transformer primary 164, which effects the described switching operations in circuits 32, 34, respectively, to reconnect the normal source and to disconnect the standby source with respect to the load.

To assure that the circuit 141 cannot effect the transfer while the circuit 140 is responding to an error signal, in the present instance, a diode 174 couples an end 171a of capacitor 171 to the anode of SCR 145 so that the capacitor 171 is continually discharged in the same manner that capacitor 162 is discharged.

It is another feature of the logic circuit that once a transfer has been made to the standby source 13 the system does not transfer back to the normal source 12, assuming the fault in the normal source has cleared, until the system is ready to respond to any subsequent error signal indicating that the normal source is again not within a predetermined voltage range. In the exemplary embodiment this is done by delaying the firing of the UJT 165 so the normal source switch commutating capacitor 79 has sufficient time to recharge and in addition, the time constant of the RC circuit including capacitor 171 and resistor 172 is longer than the time constant of the RC circuit including capacitor 162 and resistor 163. This assures that once the normal source is reconnected to the load, the switch 32 is in condition to disconnect the source if the sensor circuit notes a necessity to do so.

To prevent the return of the system to its initial state, wherein the normal source 12 is energizing the load, prior to a time when the normal source is stabilized and can carry the load, a hysteresis circuit 180 is provided. This insures that the normal source voltage has returned to a value sufficiently high so that the reduction in voltage caused by returning or transferring back the load to the normal source does not cause an error signal and initiate a transfer again to the standby source.

Describing circuit 180, it includes conductor 181 connected to diode 174 and a terminal 182 connected to the normal source 12. A resistor 184 is connected between terminal 182 and an A-C ground, the resistor having a slider 185 to permit adjustment of the voltage at which transfer back to the normal source is permitted. The picked-off voltage is rectified by a diode 186 and filtered by a capacitor 188. The filter capacitor 188 is connected to diode 174 through a diode 190.

In operation the slider 185 is adjusted so that with correct normal source voltage, the voltage developed in capacitor 188 is sufficient to reverse bias diode 190. In the event of a low line, insufficient voltage is developed on capacitor 188 causing the diode 190 and diode 174 to conduct, thereby clamping the voltage on the capacitor 171 below the firing voltage of UJT 165. In this manner the level at which the load is switched back to the line is controllable to prevent a transfer at a marginal normal source voltage. If this is not done then return of the load to a low normal source immediately signals for a transfer back to the standby source, and thus cyclical transfers would occur.

As explained, the "on-off" switches 32, 34 are responsive to one pulse to switch to one of their alternative states. To prevent the circuit 141 from continually feeding pulses to the secondary windings 138, 139, and switches 32, 34, after the initial pulse, in the present instance, a hold-down or quenching circuit 191 is provided. As herein illustrated the conductor 181 couples one end of diode 174 to the quenching circuit so that after the initial pulse the capacitor 171 is not permitted to charge-up. The circuit 191 includes a terminal 192 coupled to the standby source 13 and includes in a series circuit a resistor 194, a diode 195 and a parallel RC network having a resistor 196 and capacitor 197 connected to ground. The conductor 181 is also connected in series with the RC network through another diode 198. When the normal source 12 is energizing the load, the standby source 13 is disconnected and the resistor 196 is selected so that it keeps the emitter of UJT 165 at a low level. The operative circuit includes resistor 172, diode 174, conductor 181, diode 198 and resistor 196. Thus, the UJT circuit 141 cannot free run and produce unnecessary pulses. When the standby source 13 is connected and switch 34 is closed the capacitor 197 charges up reverse biasing diode 198 so that resistor 196 is no longer effective in holding down the UJT emitter 169. The circuit 141 is now ready should the error signal disappear to permit capacitor 171 to charge and fire the UJT 165 and couple the standby source and disconnect the normal source.

It is yet another feature of the present invention that the novel circuit 18 is provided for producing a reference signal which is completely synchronized, that is "locked-in" and "in-phase" with the output of the source 12 so that the system 10 can respond instantaneously to variations in magnitude of the source signals outside a predetermined range. As shown in FIGURE 6 the circuit receives power from a regulated power supply represented by terminals 130, 131 and includes a bistable switching means including a pair of switching elements or transistors 200, 201 coupled to a transformer 202 to provide substantially an A-C sine wave output. The transistor 200 includes an emitter 200a, a base 200b and a collector 200c. The transistor 201 includes an emitter 201a, a base 201b and a collector 201c. The transformer 202 includes a primary 204, having a pair of opposite ends 204a, 204b, coupled respectively to the collectors 200c and 201c of the transistors, and a center tap 205 which connects an inductor 206 to the transformer primary. In the present instance a transformer secondary winding 207 having a pair of opposite ends 207a, 207b, couples the reference signal to the sensing circuit 16 (see FIGURE 4). It is, of course, within the teachings of the present invention to combine transformers 101 and 202 and have only one transformer. A capacitor 208 is coupled between the transformer primary ends 204a, 204b, respectively, which in conjunction with inductor 206 provides a resonant circuit which can be switched by the operation of the transistors. The output of the switching transistors 200, 201, respectively, is a square wave, however, the inductor 206 and capacitor 208 filter the square wave, and the fundamental signal thereby produced is a sine wave.

For adjusting the amplitude of the sine wave output, a variable resistor 209 is coupled in series with the D-C source terminal 131, and a filtering capacitor 210 is connected across the inverter D-C bus to smooth the signal.

The transistors are triggered by a subcircuit 211 which is energized from an A-C source signal 212. In practice the A-C source signal 212 must be received either from the A-C normal source 12 or from some A-C source that is synchronized to the normal source 12. The A-C source signal 212 provides the base drive for the transistors in the inverter and therefore locks the reference in synchronism with the normal source 12. Describing the circuit, the A-C signal is fed through a series connection of inductor 214, variable resistor 215 and a capacitor 216. Coupled in parallel with the capacitor to receive the signal appearing thereacross is a primary winding 218 of a transformer 219 which also has a secondary winding 220 with opposite ends 220a, 220b, respectively, and a center tap 221. The secondary winding end 220a is connected through a resistor 222 and a conductor 224 to the base 200b of transistor 200. The other secondary winding end 220b is connected through another resistor 225 and a conductor 226 to the base 201b of transistor 201. The respective common emitters 200a, 201a, of the transistors 200, 201, respectively, are connected to a transformer secondary center tap 221 by a conductor 228. To prevent excessive base voltages on the respective transistors, a clamping diode 229 is connected between the base and emitter of transistor 200 and another clamping diode 230 is connected between the base and emitter of transistor 201. For protecting transistors 200, 201, respectively, against peak voltages arising from transients as can occur from loss of base drive, in the present instance, a Zener diode 231 is connected across the collector-emitter circuit of transistor 200 and another Zener diode 232 is connected across the collector-emitter circuit of transistor 201.

Describing the operation of the sine wave reference signal producing circuit 18, the transistors 200, 201 are triggered to conduction by biasing signals applied to their respective bases by respective subcircuits responsive to alternative half-cycles of the A-C signal 212. For example, when the A-C signal 212 has one polarity the subcircuit including transformer secondary end 220a is of proper polarity to bias transistor 200 to conduction and when the A-C signal 212 has an opposite polarity the subcircuit including transformer secondary end 220b is of proper polarity to bias the other transistor 201 to conduction. The phase of the reference signal produced at the transformer secondary can be selected to coincide with that of the A-C output of source 12 by adjusting the value of resistor 215.

Summarizing the operation of the present switching system 10, under normal circumstances the switch 14 couples source 12 to load 11. The monitoring means or sensor 16 compares the amplitude of the normal source 12 to the voltage of reference source 18 at every instant during the cycle. If the two signals at any instant differ beyond a predetermined amount in magnitude, an error signal 19 is produced across resistor 117 and the error signal 19 is fed through terminals 119, 120 to the logic circuit 20 (see FIGURE 5). The logic circuit receives the signal via the voltage sensing network 140 which gates the SCR 145 "on" thereby feeding the switching pulse to the primary 142 of the transformer 132.

The switching pulse is transferred to the respective transformer secondaries 135, 136. The terminals 86, 88 connect the secondary 135 to the normal source switch 14, while a similar set of terminals (not identified) connects the other transformer secondary 136 to the standby source switch 15. A pulse at the secondary 135 gates "on" the SCR 81 in the "on-off" switch 32, the effect being to turn "off" the main SCR 50 in the same switch 32. This results in a break in the circuit between terminals 38, 39 of the normal source switch diode bridge 31 and thereby prevents the further transmission of energy between normal source 12 and the load 11.

The positive and instantaneous disconnection of the load from the source is mandatory if no loss of load voltage is permissible, even in the event of a short circuit across the normal source. Elaborating on the difficulty, the prior art shows systems with a first static transfer switch consisting of a pair of silicon controlled rectifiers in inverse-parallel to connect the line to the load. Suitable gating signals are provided so that the system may handle loads of any power factor. Upon detection of a fault, the gate signals are removed and a standby source is instantaneously connected by a second static switch.

To those skilled in the art it will be evident that such a system cannot, with complete surety, protect against the loss of load voltage in the event of a short circuit across the normal source whenever the load power factor is other than unity. Considering the operation of the prior art system first, under unity power factor conditions, in the event of a source short, the switching "on" of the standby source reverse-biases the conducting SCR in the line switch forcing it "off." In this circumstance the load has been successfully transferred with no loss of voltage. However, in the event of a source short with a non-unity power factor load this may or may not be the case depending upon the time in the cycle during which the fault occurs.

Explaining further, as is well known in the art, a reactive load receives energy from a source during the first portion of a cycle and feeds back energy to the source during a later portion of the cycle. A sort circuit occurring in the former portion results in a successful transfer as described above. However, a short circuit occurring in the source at the time reactive energy is being fed back to the source through an SCR results in the load feeding the short. If, in addition, the standby source is connected to the load because of a signaled reduction in source voltage, the standby source would also feed the short. It is necessary, therefore, to force-off or commutate-off the normal source switch 32 to prevent the above. Merely removing the gate signal does not suffice in this instance. Thus, the present invention by providing a means for commutating-off the normal source switch at the same time that the standby source is connected, assures uninterrupted flow of energy to the load with no loss of load voltage, even in the event of a short in the source.

The switching pulse in the other secondary winding 136 is fed to the "on-off" switch 34. The latter circuit is shown only in bloc diagram form because it is a duplicate of the "on-off" switch circuit 32 shown in detail in FIGURE 3. Terminals similar to those identified as 74, 75, in FIGURE 3 receive and convey the switching pulse to the gate of a firing SCR similar to SCR 66 in circuit 32. The latter SCR is forward biased by the D-C network so that when the switching pulse fires it, the D-C signal is applied to the gate of a main silicon controlled rectifier like SCR 50. Once the pulse resulting from the error signal is received so that the D-C signal is applied to the gate of the main SCR, the latter is held in a conductive state by the D-C signal from the D-C biasing network.

The "on-off" switch 34 remains "on" so that the standby source switch 15 couples the standby source 13 to the load 11. Simultaneously, a circuit is completed through an indicator light 26 to show that the load is being energized from the standby source 13.

The sensor or monitor 16 continually compares the signal from the normal source 12 to the signal from the reference source 18. As long as the normal source signal is not within a predetermined range as compared to the reference source signal, the error signal 19 triggers the pulsing circuit 140 so that the latter provides gating pulses for the SCR 145. As a result, the firing capacitor in the pulsing circuit 141 cannot charge-up and no pulse can be produced in the transformer 134. However, if the normal source signal changes so that it is within a predetermined range of the reference source signal, then the error signal 19 disappears and the SCR 145 is no longer gated "on."

The capacitor 171 in circuit 141 can then charge-up so as to fire the unijunction transistor 165 and thereby feed the switching pulse to the primary 164 of transformer 134. The pulse signal appears across the secondaries 138, 139 of the transformer, respectively. The pulse signal in the transformer secondary 138 is fed to terminals 74, 75 of the "on-off" switch 32 thereby turning "on" the latter. This is effected in the same manner as described above with regard to the operation of the "on-off" switch 34. The pulse in the transformer secondary 139 is fed to a pair of terminals like 86, 88 in the "on-off" switch 34 which operate in the same manner as explained above to turn "off" the main SCR in the "on-off" switch 34. Accordingly, the transfer of the energization of the load is accomplished from the standby source 13 to the normal source 12.

To prevent the transfer from the standby source 13 to the normal source 12 before the normal source is fully capable of handling the load the hysteresis circuit 180 is provided. The circuit 180 assures that the normal source signal has risen above a predetermined lower limit level of the reference signal. The adjustable resistor 184 permits selection of the "over-signal" the normal source 12 must achieve.

The logic circuit 20 assures that switching pulses are not continually fed to the respective "on-off" switches 32, 34, once the initial pulse effecting transfer has been received. The RC network including resistor 163 and capacitor 162 has a long time constant as compared to the pulsing rate of the circuit 140, thus the capacitor 162 does not change-up to a level which effects a significant pulse in transformer 132 until the SCR 145 is turned "off." For the other pulsing circuit 141, the quenching circuit 191 is provided. The latter quenches subseqeunt pulses produced by the pulsing circuit 141 after the initial pulse which effects a transfer of the load energization from the standby source 13 to the normal source 12.

While the invention has been described in connection with one specific embodiment, it is to be understood that this is by way of illustration and not by way of limitation.

What is claimed is:

1. In an A-C source switching system coupled to a first, normally used source and to a second, standby source, the system normally coupling the first source to a load, the combination comprising a first switch selectively operable to couple the normally used source to the load, a second switch selectively operable to couple the standby source to the load, means for producing an A-C reference signal corresponding in waveshape to the first source signal, means for continuously monitoring the first source signal and comparing the first source signal to the reference signal to produce an error signal if the amplitudes of the respective signals fail to correspond, and means for effecting operation of said respective first and second switches substantially instantaneously to connect the second source to the load and disconnect the first source from the load in response to presence of said error signal.

2. An A-C switching system as claimed in claim 1 in which said first switch includes a first silicon controlled rectifier selectively operable to couple the normally used source to the load, and further comprising a first pair of biasing networks, one network for gating said first silicon controlled rectifier "on" and another network for turning said first silicon controlled rectifier "off," said second switch having a second silicon controlled rectifier selectively operable to couple the standby source to the load, a second biasing network for gating said second silicon controlled rectifier "on," and means for effecting operation of said first pair of biasing networks and said second biasing network in response to said error signal to substantially instantaneously turn "on" said second silicon controlled rectifier to thereby connect the second source to the load and to substantially simultaneously turn "off" said first silicon controlled rectifier to thereby disconnect the first source from the load, said pair of biasing networks being responsive to disappearance of said error signal to reconnect the first source to the load and disconnect the second source from the load.

3. The combination of claim 2 wherein said second biasing network includes a pair of networks, said first network gating said second silicon controlled rectifier "no" and a second network for turning said second silicon controlled rectifier "off."

4. The combination of claim 2 in which said means for producing an A-C reference signal produces a sine wave reference signal, said monitoring means having means for receiving said sine wave reference signal and comparing the first source signal to said sine wave reference signal to thereby produce said error signal if said respective reference signal and source signal amplitudes fail to correspond.

5. In an A-C switching system coupled to a first, normally used source and to a second, standby source, the system normally coupling the first source to a load, the combination comprising a first switch selectively operable to couple the normally used source to the lard, a second switch selectively operable to couple the standby source to the load, means for producing an A-C reference signal corresponding in waveshape to the first source signal, means for continuously monitoring the first source signal and comparing the first source signal to the reference signal to produce an error signal, when the amplitudes of the first source and reference signals fail to correspond, and a logic circuit having a sensitive triggering network utilizing outside biasing power to respond to said error signal for producing respective pulses to substantially instaneously turn "on" said second switch to thereby connect the second source to the load and substantially simultaneously therewith to turn "off" said first switch to disconnect the load from the first source, said logic circuit responsive to disappearance of said error signal to reconnect the first source to the load and disconnect the second source from the load.

6. The combination of claim 5 wherein said logic circuit includes means for quenching suceeding pulses once the second source is connected to the load and the first source is disconnected from the load in response to presence of said error signal.

7. The combination of claim 5 wherein said logic circuit includes means for delaying return of load energization to the first source following a transfer to the second source until the first source has stabilized and can carry the load.

8. In an A-C monitoring circuit for continually sensing and comparing a first A-C source signal to a second A-C source signal, comprising in combination a first subcircuit including first and second switching elements, respectively, coupled in series and responsive to a voltage difference thereacross in one direction to permit one of said switching elements to conduct, and responsive to a voltage difference in the opposite direction to permit the other of said switching elements to conduct, a second subcircuit including like first and second switching elements, means for receiving said first A-C source signal coupled to said respective first switching elements in each of said respective subcircuits, means for receiving said second A-C source signal coupled to said respective second switching elements in each of said respective subcircuits, and a common impedance coupled to said respective first and second subcircuits and responsive to conduction by one of said switching elements in each of said subcircuits to produce an error signal, said respective switching elements of said first subcircuit being responsive to voltage levels of said respective A-C sources during a first half cycle, and said respective switching elements of said second subcircuit being responsive to voltage levels of said respective A-C sources during the succeeding half cycle.

9. The combination of claim 8 wherein said first and second switching elements, respectively, in such subcircuit are series coupled diodes which are selectively polarized for conduction, as the voltage across said diodes changes from being relatively higher at said first diode to being relatively higher at said second diode.

References Cited

UNITED STATES PATENTS 3,249,769 5/1966 Mierendorf _____ 307—64 X
3,300,651 1/1967 Larson _____ 307—64 X ROBERT K. SCHAEFER, Primary Examiner H. J. HOHAUSER, Assistant Examiner